United States Patent
Venkataraj

(10) Patent No.: US 8,645,785 B2
(45) Date of Patent: Feb. 4, 2014

(54) METHOD OF RE-ORDERING RECEIVED DATA BLOCKS IN HYBRID AUTOMATIC REPEAT REQUEST TELECOMMUNICATION SYSTEM

(75) Inventor: Naveen Kumar Venkataraj, Bangalore (IN)

(73) Assignee: Freescale Semiconductor, Inc., Austin, TX (US)

( * ) Notice: Subject to any disclaimer, the term of this patent is extended or adjusted under 35 U.S.C. 154(b) by 319 days.

(21) Appl. No.: 13/046,815

(22) Filed: Mar. 14, 2011

(65) Prior Publication Data

US 2012/0240000 A1    Sep. 20, 2012

(51) Int. Cl.
*H04L 1/18* (2006.01)
*H03M 13/00* (2006.01)

(52) U.S. Cl.
USPC .......................................... 714/749; 714/751

(58) Field of Classification Search
None
See application file for complete search history.

(56) References Cited

U.S. PATENT DOCUMENTS

| | | | |
|---|---|---|---|
| 5,940,769 A * | 8/1999 | Nakajima et al. ............ | 455/509 |
| 6,021,124 A * | 2/2000 | Haartsen ....................... | 370/336 |
| 6,388,999 B1 * | 5/2002 | Gorsuch et al. ............... | 370/335 |
| 6,424,645 B1 * | 7/2002 | Kawabata et al. ............ | 370/347 |
| 6,542,490 B1 * | 4/2003 | Ahmadvand et al. ......... | 370/338 |
| 6,693,910 B2 | 2/2004 | Chao | |
| 7,065,068 B2 * | 6/2006 | Ghosh et al. .................. | 370/342 |
| 8,045,507 B2 * | 10/2011 | Kim et al. ..................... | 370/328 |
| 2004/0037224 A1 * | 2/2004 | Choi et al. .................... | 370/235 |
| 2007/0263568 A1 * | 11/2007 | Kim et al. ..................... | 370/331 |
| 2008/0209297 A1 | 8/2008 | Chandra | |
| 2008/0253346 A1 | 10/2008 | Terry | |
| 2009/0006910 A1 | 1/2009 | Hamzeh | |
| 2010/0110991 A1 * | 5/2010 | Kwak ............................ | 370/328 |
| 2010/0220709 A1 * | 9/2010 | Peisa ............................ | 370/345 |
| 2010/0284360 A1 | 11/2010 | Dalsgaard | |
| 2011/0090808 A1 * | 4/2011 | Chen et al. .................... | 370/252 |

* cited by examiner

*Primary Examiner* — Daniel McMahon
(74) *Attorney, Agent, or Firm* — Charles Bergere

(57) ABSTRACT

A method of transmitting data blocks between a user equipment and a station using parallel hybrid automatic repeat request processes. The station includes a scheduler that signals to the user equipment allocations of resources and parameters for transmission and re-transmission of the data blocks, and a set of reception buffers that receive and re-order the data blocks. The scheduler assigns a reception index to the corresponding scheduled reception and assigns reception buffers to received data blocks as a function of the assigned reception indexes identifying time slots scheduled for reception. A newly transmitted data block received in its scheduled time slot is assigned to the reception buffer corresponding to a new reception index. A re-transmitted data block received in a time slot later than its originally scheduled time slot is assigned to the reception buffer corresponding to a same reception index as its originally scheduled reception.

15 Claims, 7 Drawing Sheets

US 8,645,785 B2

METHOD OF RE-ORDERING RECEIVED DATA BLOCKS IN HYBRID AUTOMATIC REPEAT REQUEST TELECOMMUNICATION SYSTEM

BACKGROUND OF THE INVENTION

The present invention is directed to telecommunication systems and, more particularly, to a method of re-ordering received data blocks in hybrid automatic repeat request telecommunication ('Hybrid ARQ' or 'HARQ') system.

Various packet-switched data network telecommunication standards, such as Third Generation Partnership Project ('3GPP')™, Universal Mobile Telecommunications System ('UMTS'), Long Term Evolution ('LTE'), Long Term Evolution—Advanced ('LTE-Advanced') and Worldwide Interoperability for Microwave Access ('WIMAX') for example use Hybrid ARQ. Hybrid ARQ is a combination of forward error-correcting coding and error detection using the standard automatic repeat request ('Standard ARQ') error-control method. In Standard ARQ, redundant bits are added to data to be transmitted using an error-detecting code such as cyclic redundancy check ('CRC'). In Hybrid ARQ, forward error correction ('FEC') bits are added to the existing Error Detection ('ED') bits (such as Reed-Solomon code, Convolutional code or Turbo code) to correct a subset of all errors while relying on ARQ to detect uncorrectable errors.

In certain specific cases of Hybrid ARQ operation, the receiving end of the system has control over the scheduling of the transmissions. One example is the LTE uplink data transmission as described in the 3GPP Medium Access Control ('MAC') specification where the uplink scheduler of the base station receiving entity eNodeB controls the uplink transmissions from the User Equipment ('UE'). Reception and decoding of data blocks successfully during telecommunication over the air as transmission media is subject to data block errors. Hybrid ARQ involves transmitting data blocks bearing the same information repeatedly until either the receiving end sends an acknowledgement signal ('ACK') indicating the successful reception and decoding of the data block or the number of repetitions exceeds a threshold set for the number of times data can be re-transmitted.

There is a time gap between the transmission of a data block and the reception of the corresponding ACK signals (or negative acknowledgement ('NAK') signals indicating failed reception and decoding of the data block). To increase the data transmission rate multiple parallel Hybrid ARQ processes can be interleaved in the time gap. It can be noted that, as a consequence, the receiving end experiences out of order reception of data blocks. It is then necessary for the receiver to re-arrange or re-order the data blocks which are received out of order due to the parallel Hybrid ARQ processes in the original order of transmission. Issues arise with ensuring that the re-ordering occurs robustly and efficiently without excessive load on the central processing unit ('CPU') or excessive memory requirements.

BRIEF DESCRIPTION OF THE DRAWINGS

The present invention is illustrated by way of example and is not limited by embodiments thereof shown in the accompanying figures, in which like references indicate similar elements. Elements in the figures are illustrated for simplicity and clarity and have not necessarily been drawn to scale.

DETAILED DESCRIPTION OF PREFERRED EMBODIMENTS

The following examples of embodiments of the invention are compliant with the LTE standard. However, it will be appreciated that the invention is also applicable to other packet-switched data network telecommunication standards using parallel Hybrid ARQ processes, such as 3GPP™, UMTS, LTE-Advanced and WIMAX, for example.

Figure 1:
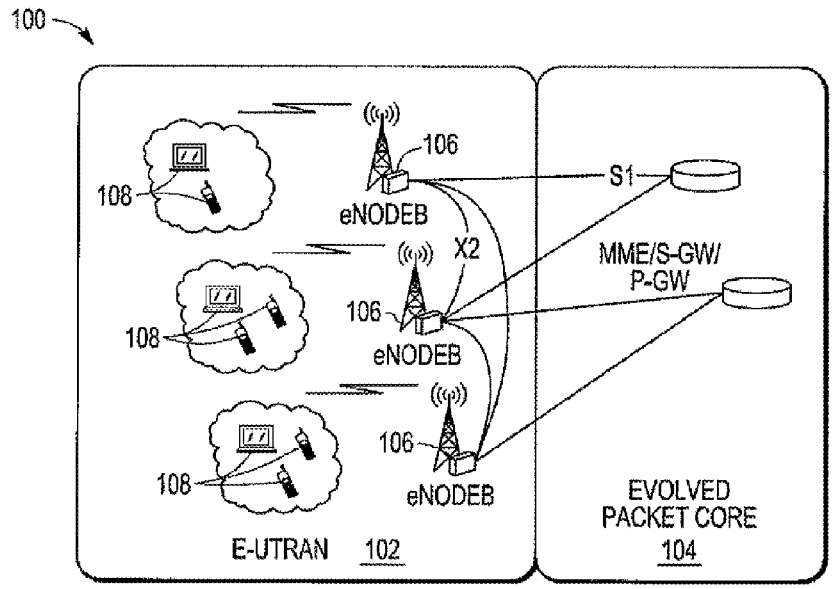
FIG. 1 is a schematic diagram of elements of a telecommunication system compliant with the LTE standard.

FIG. 1 illustrates generically elements of a typical telecommunication system 100 compliant with the LTE or LTE Advanced standards. The LTE system 100 comprises an evolved UMTS Terrestrial Radio Access Network ('e-UTRAN') 102 and an Evolved Packet Core 104. The e-UTRAN 102 comprises eNodeB transmit, receive and processing stations 106, which are normally fixed geographically, and user equipment ('UE') modules 108 which are normally mobile. The eNodeB stations 106 communicate with the UE modules 108 and perform radio access network control functions. The Evolved Packet Core 104 comprises units 110 which are linked to the eNodeB stations and interface with the Internet and each comprising Mobility Management Entity ('MME'), Serving Gateway ('S-GW') and public data network gateway ('P-GW') components.

The uplink scheduler of the eNodeB station 106 controls the uplink transmissions from the UE 108. In the downlink there are several physical channels, including the Physical Control Channel (PDCCH), which carries among others the downlink allocation information and uplink allocation grants for the UE 108, and the Physical Hybrid ARQ Indicator Channel (PHICH) used to carry acknowledgement signals such as ACK and NAK for reception of the uplink transmissions.

Figure 2:
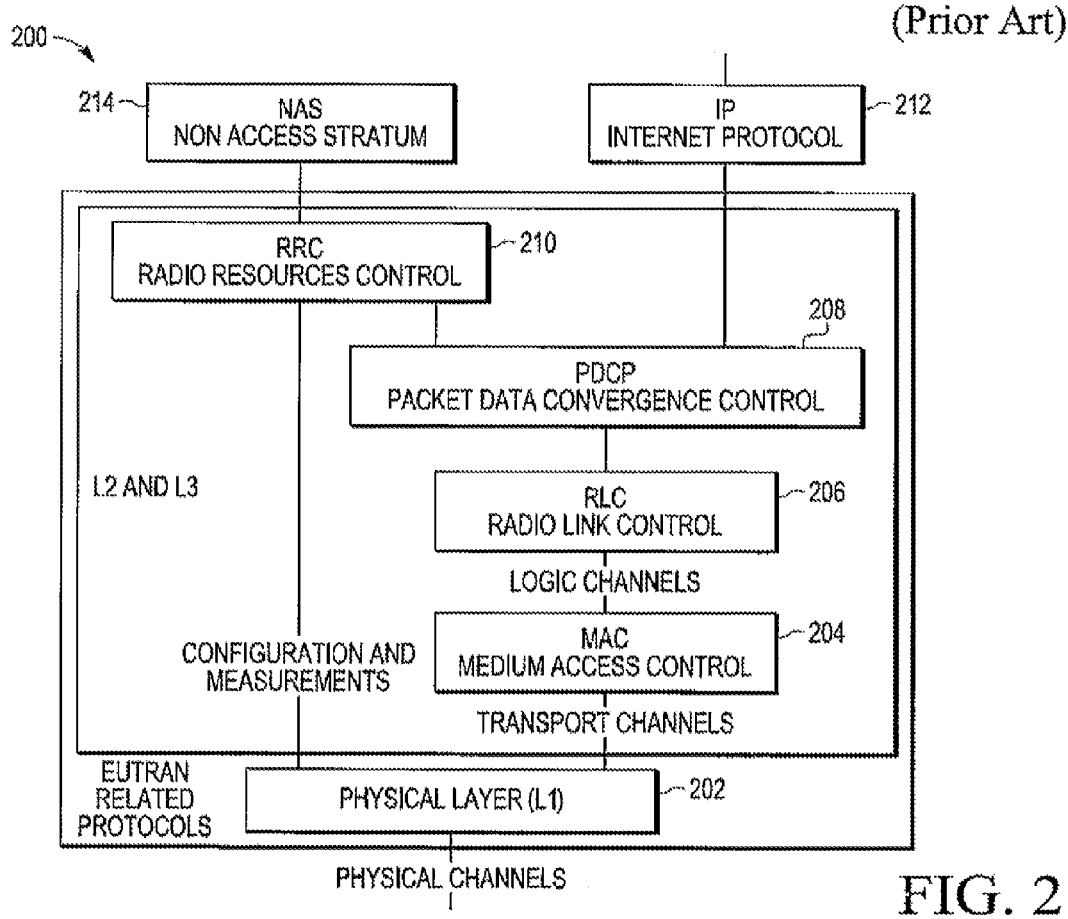
FIG. 2 is a schematic diagram of an e-UTRAN protocol stack used in the system of FIG. 1.

The functioning of e-UTRAN is defined by a protocol stack 200 illustrated in FIG. 2. The protocol stack 200 includes a level 1 Physical layer 202 which carries all information from the Medium Access Control ('MAC') transport channels over the air interface. The MAC sub-layer 204 offers a set of logical channels to the Radio Link Control ('RLC') sub-layer 206 that it multiplexes into the transport channels of the physical layer 202. The MAC sub-layer 204 also participates in the Hybrid ARQ error correction among other functions. The RLC sub-layer 206 transports the Protocol Data Units ('PDUs') for the Packet Data Convergence Control ('PDCP') sub-layer 208 and, depending on its mode, it can provide ARQ error correction, segmentation/concatenation of PDUs, re-ordering for in-sequence delivery and duplicate detection, for example. The PDCP sub-layer 208 provides transport of data for the Radio Resources Control ('RRC') layer 210 and provides transport of the Internet Protocol ('IP') packets for the IP layer 212. The RRC layer 210 takes care of broadcasted system information related to the access stratum and transport of the non-access stratum ('NAS') messages, and other functions such as paging, establishment and release of the RRC connection, security key management, handover, UE measurements related to inter-system mobility, and Quality of Service ('QoS') for example. Interfacing layers to the e-UTRAN protocol stack 200 include the NAS protocol 214 between the UE and the MME on the network side (outside of e-UTRAN) and the IP layer 212.

Figure 3:
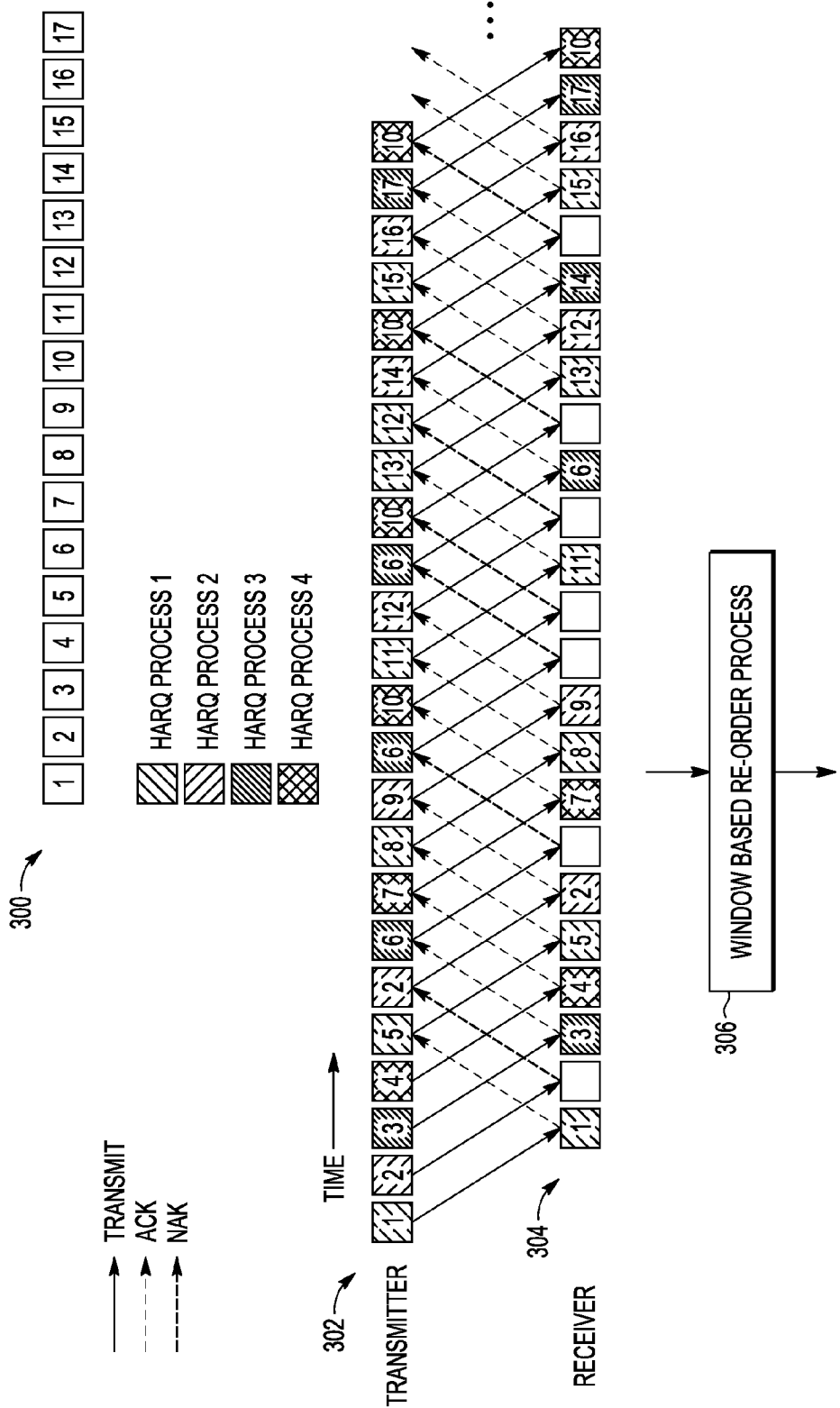
FIG. 3 is a schematic diagram of exchanges of signals in communication in the system of FIG. 1 with parallel Hybrid ARQ operation.

FIG. 3 illustrates a specific case of Hybrid ARQ operation where the receiving end has the control over the scheduling of the transmissions, which is the case for the telecommunication system 100 with the e-UTRAN stack 200. In the case of the LTE standard, during uplink data transmission as described in the section [3GPP-MAC], the uplink scheduler of the receiving entity eNodeB 106 controls the uplink transmissions from the UE 108, which comprise an input data stream 300 encapsulated in a set of data blocks transmitted with sequence numbers. The eNodeB 106 therefore manages the Hybrid ARQ processes and allocates transmission time slots to be used by the UE 108 and has that information available for use during reception of the corresponding transmissions. In accordance with the LTE standard, up to eight parallel Hybrid ARQ processes may be used for the uplink to obtain re-transmission of missing data blocks bearing same information repeatedly until either the receiving end sends an ACK information indicating the successful reception and decoding of the data block, or the number of repetitions exceeds the set threshold. In FIG. 3 and the following description, for simplification, only four Hybrid ARQ processes are illustrated but it will be appreciated that other numbers of Hybrid ARQ processes may be used. The corresponding Hybrid ARQ ('HARQ') processes of the receiver are identified in FIG. 3 by different hatching styles. In LTE MAC PDUS are not numbered, only the RLC PDUs are numbered. The drawing shows block numbers associated with the data blocks for ease of explanation only Due to the time gap between transmission of the data blocks and reception of the ACK (or NAK) signals, the receiving end experiences out of order reception of data blocks. This is illustrated in FIG. 3, where the data stream 302 illustrates the data blocks in the uplink transmissions and re-transmissions of the transmitter of the UE 108 and the data stream 304 illustrates the data stream received at the receiver of the eNodeB station 106. The transmissions and re-transmissions are shown as full lines, ACK signals as dashed lines and NAK signals as dotted lines. By way of example, the transmitted data block 1 is shown using Hybrid ARQ process 1, is correctly received and decoded and the eNodeB station 106 sends an ACK signal. The transmitted data block 2 is shown using Hybrid ARQ process 2, is not correctly received and decoded and the eNodeB station 106 sends a NAK signal. The eNodeB station 106 identifies to the UE 108 which MAC PDU to re-transmit by the transmission time slot in which the UE receives the NAK signal, correction made for the number of parallel Hybrid ARQ processes being used. The transmitted data blocks 3 and 4 are shown using Hybrid ARQ processes 3 and 4, are correctly received and decoded and the eNodeB station 106 sends ACK signals. After receiving the ACK signal for data block 1, the UE 108 transmits data block 5 using Hybrid ARQ process 1 and this is shown as correctly received and decoded. On receiving the NAK signal for data block 2, the UE 108 re-transmits data block 2 using Hybrid ARQ process 2 and the same or a different version of redundancy, which is shown as correctly received and decoded. After receiving the ACK signal for data block 3, the UE 108 transmits data block 6 using Hybrid ARQ process 3. Data block 6 is shown as not correctly received and decoded, the eNodeB station 106 sends a NAK signal, the UE 108 re-transmits data block 6 using Hybrid ARQ process 3, the data block 6 is shown as again not correctly received and decoded, the eNodeB station 106 again sends a NAK signal, and the UE 108 again re-transmits data block 6 using Hybrid ARQ process 3, which is shown this time as being correctly received and decoded. The resulting out of order reception of the data blocks is corrected by a re-ordering process 306.

Figure 4:
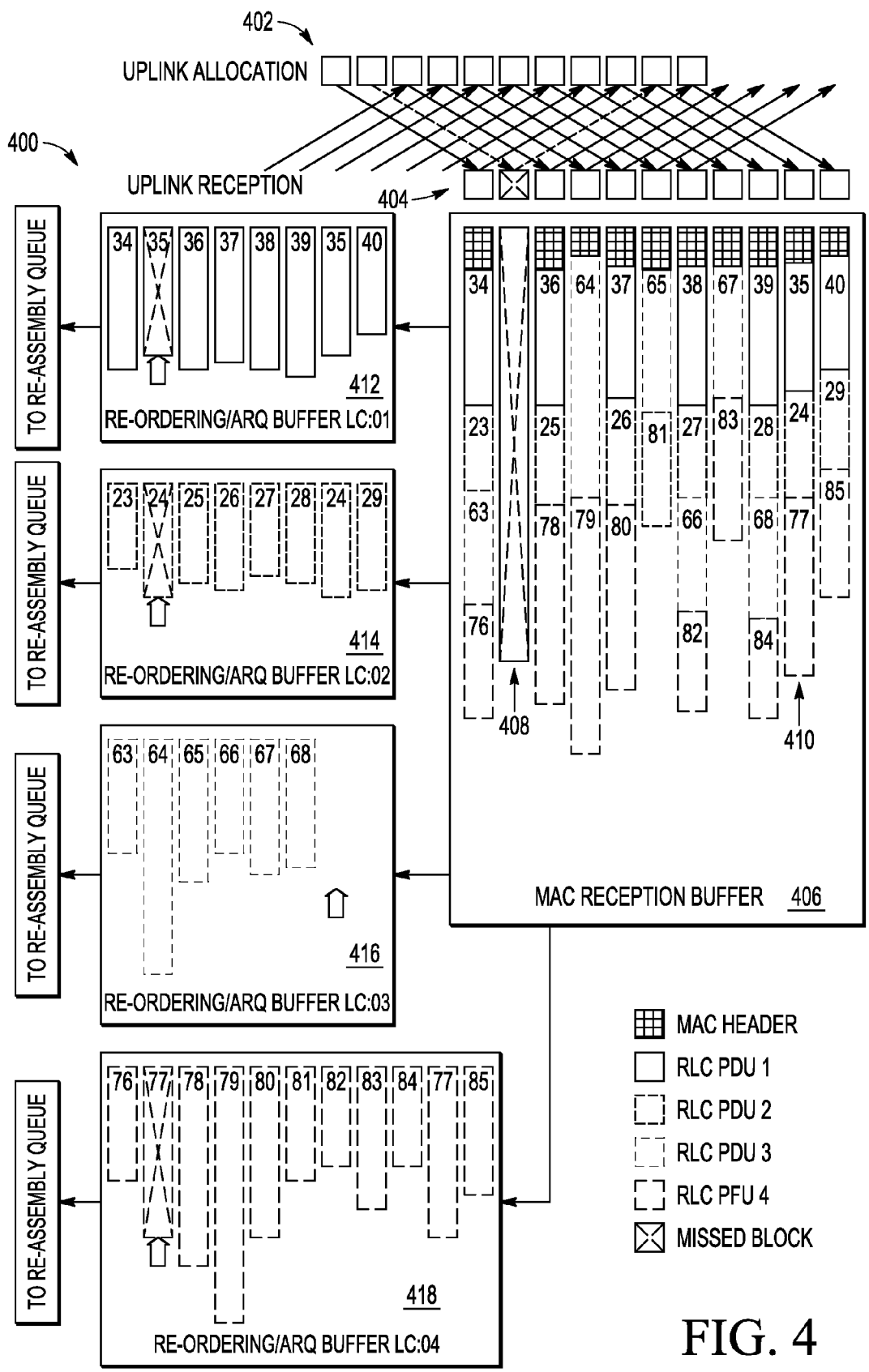
FIG. 4 is a schematic diagram of signals appearing in a known method of re-ordering received data blocks during parallel Hybrid ARQ processing of signals of the kind shown in FIG. 3.

FIG. 4 illustrates a known method 400 of performing the re-ordering process 306 in the RLC sub-layer 206. The data streams 302 and 304 are shown as transmitted (or re-transmitted) data blocks 402 and received MAC data blocks (or MAC PDUs) 404, the MAC data blocks 404 received in the MAC reception buffer being shown in more detail at 406. The examples of transmissions and receptions shown are further simplified for clarity, one of the transmitted data blocks 402 being shown at 408 as not correctly received and decoded at 408, re-transmitted and correctly received and decoded at 410.

As shown, each MAC data block comprises a set of RLC PDUs. For the purposes of illustration, four RLC PDUs are shown as vertical bars for each MAC data block, with different outline styles. The top bar represents the MAC header, which bears no sequence number in the LTE standard. Each RLC PDU is transmitted bearing a respective sequence number, as shown. The sequence numbers are encoded in the RLC PDU header to assist the process of re-ordering. When a UE 108 is active in data transmission two data streams for signaling purposes are required called signaling radio bearers (SRB). The standard allows up to 8 additional data streams for user data called data radio bearers (DRB). In the following, we assume that in a practical work load model two additional data streams are present.

In the process 400, the re-ordering is performed in re-ordering and ARQ buffers and re-assembly queues shown at 412, 414, 416 and 418. The process is performed on the basis of the transmitted RLC PDU sequence numbers as many times for each MAC PDU of the data stream 404 as there are RLC PDUs in the MAC PDU, in this case four times for each MAC PDU.

Figure 5:
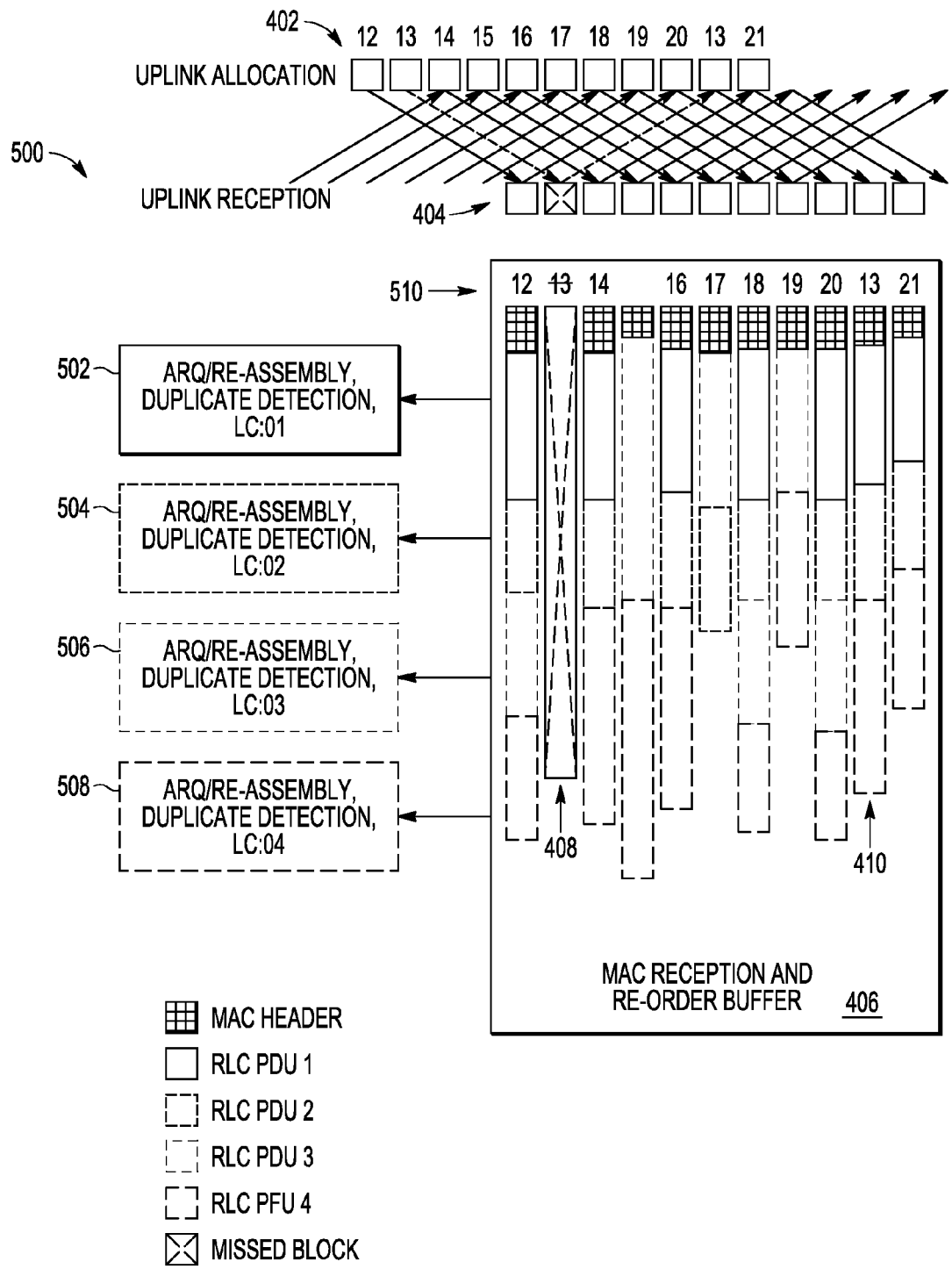
FIG. 5 is a schematic diagram of signals appearing in a method of re-ordering received data blocks during parallel Hybrid ARQ processing of signals of the kind shown in FIG. 3 in accordance with an embodiment of the invention, given by way of example.

FIG. 5 illustrates a method 500 of performing the re-ordering process 306 in accordance with an example of an embodiment of the present invention. The data streams 302 and 304 are again shown as transmitted (or re-transmitted) data blocks 402 and received MAC PDUs (or MAC data blocks) 404, the MAC PDUs 404 received in the MAC reception buffer being shown in more detail at 406. The same examples of transmissions and receptions as FIG. 4 simplified for clarity are shown again, one of the transmitted data blocks 402 being shown at 408 as not correctly received and decoded at 408, re-transmitted and correctly received and decoded at 410.

The method 500 forms part of a method of telecommunication between a user equipment 108, and a station 106 using parallel hybrid automatic repeat request processes. The station 106 comprises a scheduler 204, 206 signaling to the user equipment 108 allocations of resources and parameters for transmission and re-transmission of the data blocks and a set of reception buffers 502 to 508 for receiving and re-ordering data blocks from the user equipment. The reception buffers 502 to 508 may be part of the scheduler 204, 206. The method comprises the scheduler 204, 206 assigning a reception index to each data block to be transmitted by the user equipment, and the scheduler assigning reception buffers from the set 502 to 508 to received data blocks as a function of the respective originally scheduled reception indexes identifying the time slots scheduled for reception, so that a data block newly transmitted by the user equipment 108 and received in its scheduled time slot is assigned to the reception buffer corresponding to the new reception index, whereas a data block re-transmitted by the user equipment 108 and received in a time slot later than its originally scheduled time slot is assigned to the reception buffer corresponding to the same reception index as its originally scheduled reception. In this embodiment of the invention, the data blocks to which the scheduler 204, 206 assigns a reception index and a reception buffer of the set are Media Access Control Packet Data Units ('MAC PDUs').

In this example of an embodiment of the present invention, the information used by the station for re-ordering of the MAC PDUs is based on the reception indexes of the MAC PDUs and the transmission parameters of the user equipment, which are controlled by the station. The re-ordering is accomplished without requiring and without using, even if present, the sequence numbers assigned to RLC PDUs by the transmitting end.

FIG. 5 illustrates in more detail the method 500 applied to the LTE telecommunications of FIGS. 1 to 3. When the scheduler comprising the MAC protocol 204 and the RLC protocol 206 of the station 106 schedules a transmission by the UE, it also assigns a reception index 510 to the corresponding scheduled reception of the transmission. The reception index does not need to be transmitted to the UE 108 but is associated with the time slot that the eNodeB 106 instructs the UE 108 to use for the transmission. The scheduler 204 and 206 assigns reception buffers from the set 406 to received data blocks as a function of the respective originally scheduled reception indexes 510 identifying the time slots scheduled for reception. A data block newly transmitted by the UE and received in its scheduled time slot is assigned to the reception buffer corresponding to the new reception index. However, a data block re-transmitted by the UE and received in a time slot later than its originally scheduled time slot is assigned to the reception buffer corresponding to the same reception index as its originally scheduled reception.

When the UE is instructed to make a new transmission it transmits the MAC PDU consisting of the immediate next data bytes. Accordingly, the eNodeB is able to identify that the MAC PDU 408 is missing, that the next MAC PDU is not 408 and that the MAC PDU 410 is the re-transmission of the MAC PDU 408, since the UE transmission timing is accurate relative to the assigned time slots. In the process 500, the re-ordering is performed on the basis of the reception index attributed by the MAC layer. The RLC PDUs are assigned to the ARQ/re-assembly buffers 502 to 508, which also enable duplicate detection. The process is performed on the basis of the reception index once only for each MAC PDU of the data stream 404. The re-ordering process of the method 500 reduces the processing requirements and memory variables compared to the method 400 by a factor 1/(average number of RLC PDUs per MAC PDU). Duplicate detection does not need to be performed by searching the reception buffer 406 of size WindowSize/2 to detect if the sequence number is already received as in known techniques. Instead, in the process 500, the RLC sub-layer 206 receives PDUs from the MAC sub-layer 204 after re-ordering the PDUs based on the reception indexes of the MAC PDUs. Duplicate detection is then readily performed in the RLC layer 206, since if the sequence number of the received RLC PDU is equal to or behind (that is to say less than in modulo operation) the next expected sequence number the received RLC PDU is considered to be a duplicate.

In the example illustrated in FIG. 5, the transmissions of the UE 108 are assigned reception indexes 510 from '12' to '21'. The original transmissions of MAC PDUs for reception indexes '12' and '14' to '21' are shown as correctly received and decoded. However the reception or decoding of MAC PDU 408, corresponding to reception index '13' is shown as missing. The re-transmission as MAC PDU 410 is shown as correctly received and decoded, still with its original reception index '13'.

The range of the reception indexes is 0 to N. N is chosen such that N is greater than or equal to the number of parallel Hybrid ARQ processes multiplied by the maximum permitted number of times of transmission of a data block with the same information content, and such that it is easy to perform modulo N operations.

Figure 6:
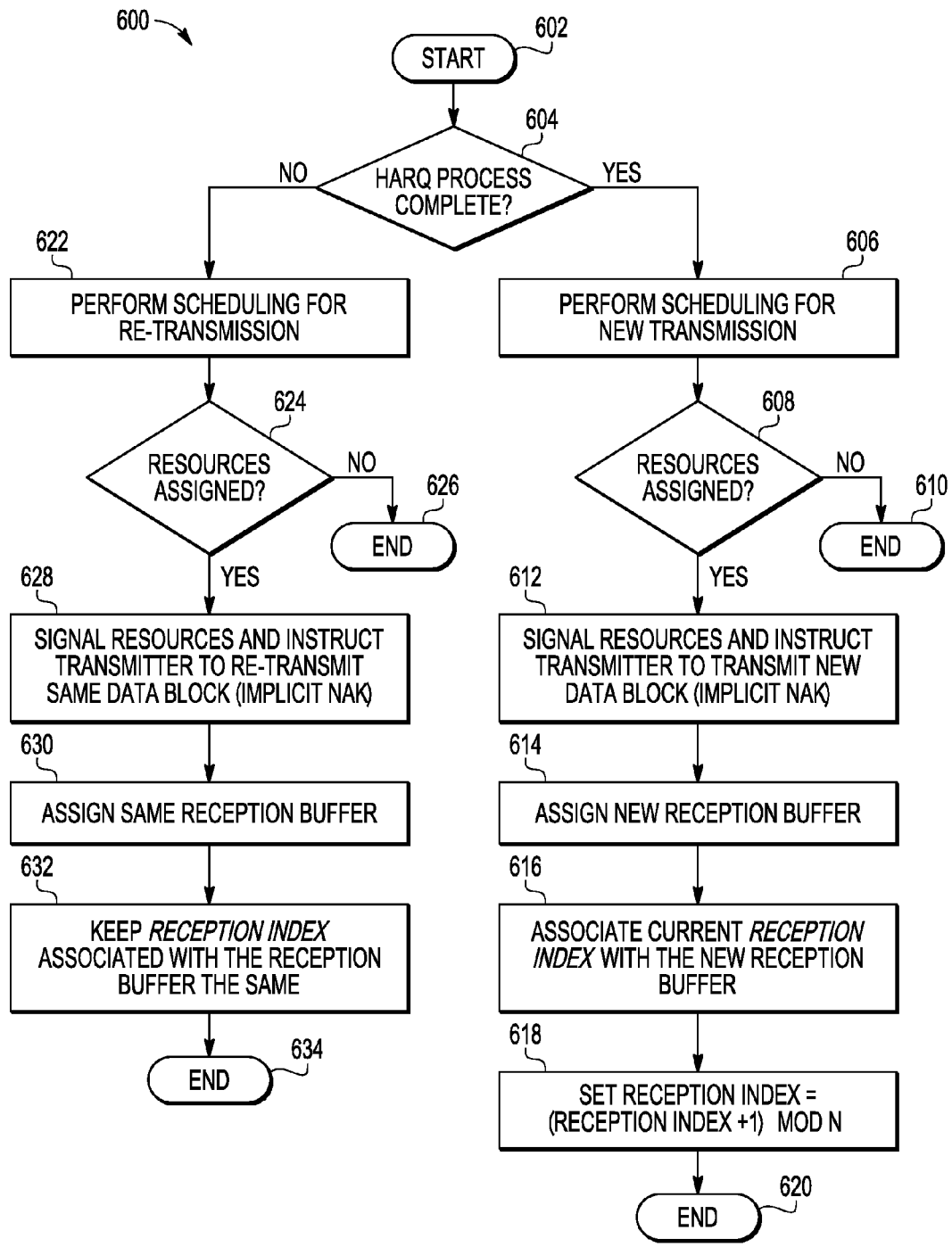
FIG. 6 is a flow chart of a procedure followed by a scheduling entity at each scheduling event for re-ordering received data blocks during the method of FIG. 5 in accordance with an embodiment of the present invention, given by way of example.

FIG. 6 illustrates a procedure 600 followed by the scheduler 204, 206 at each scheduling event for re-ordering received data blocks during parallel Hybrid ARQ processing of the signals of FIG. 3 in accordance with one example of an embodiment of the present invention, given by way of example. The procedure 600 starts at 602 and at 604 a decision is taken whether the Hybrid ARQ process is complete and the current MAC PDU is successfully received and decoded. If it is, the scheduler 204, 206 schedules transmission of a new MAC PDU at 606. At 608, a decision is taken whether resources are assigned and if not, the Hybrid ARQ processing for the reception event of that MAC PDU ends at 610 and a new MAC PDU may be scheduled from the same Hybrid ARQ process subject to there being a bandwidth demand (for example if the UE 108 has signaled buffer status which indicates that the UE has more data to send) and the availability of transmission resources, for example. If transmit resources are assigned, the scheduler signals the resources and time slots to use to the UE 108 and instructs the UE to transmit the new MAC PDU (which constitutes an implicit ACK signal) at 612. At 614, the scheduler 204, 206 assigns a new reception buffer of the set 502 to 508 to the expected reception of the new MAC PDU and associates the new, original reception index with the new reception buffer at 616. The scheduler 204, 206 then increments the current reception index to (current reception index +1)modN and the procedure ends at 620.

If at 604 the Hybrid ARQ process is not complete, because the current MAC PDU is not successfully received and decoded, the scheduler 204, 206 schedules re-transmission of the missed MAC PDU at 622. At 624, a decision is taken whether resources are assigned and if not, the Hybrid ARQ processing for the reception event of that MAC PDU ends at 626. If transmit resources are assigned, the scheduler signals the resources and time slots to use to the UE 108 and instructs the UE to re-transmit the same MAC PDU (which constitutes an implicit NAK signal) at 628. At 630, the scheduler 204, 206 assigns the same reception buffer of the set 502 to 508 to the expected reception of the re-transmitted MAC PDU and associates the same, original reception index with the same previously assigned reception buffer as for the missed MAC PDU at 632 and the procedure ends at 634.

Figure 7:
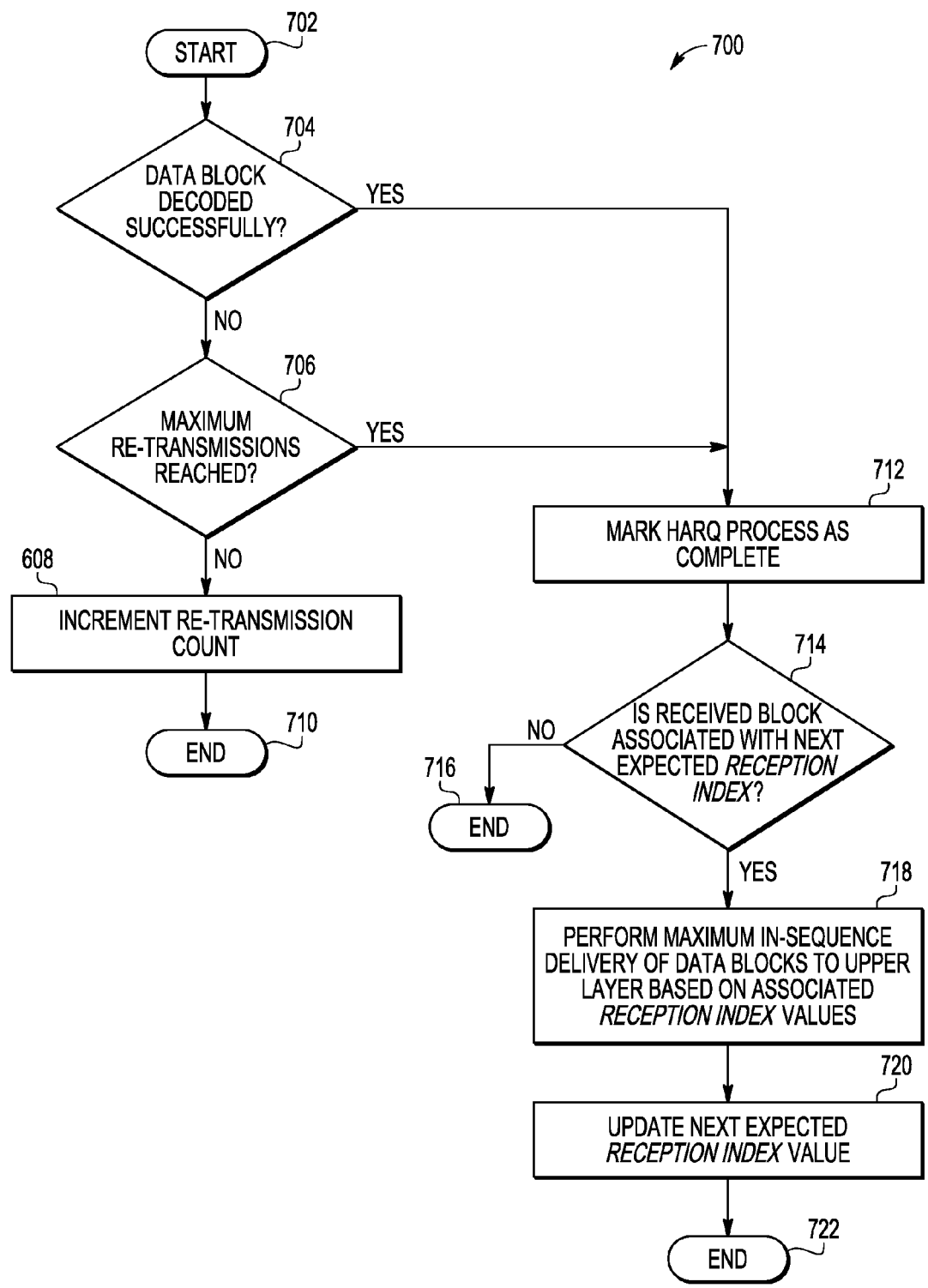
FIG. 7 is a flow chart of a procedure followed by a reception entity at each reception event for re-ordering received data blocks during the method of FIG. 5 in accordance with an embodiment of the invention, given by way of example.

FIG. 7 illustrates a procedure 700 followed by a reception entity of the station 106 at each reception event for re-ordering received data blocks during parallel Hybrid ARQ processing of the signals of FIG. 3 in accordance with one example of an embodiment of the invention, given by way of example. The procedure 700 starts at 702 and a decision is taken at 704 whether the MAC PDU has been successfully received and decoded. If not, a decision is taken at 706 whether the maximum permitted number of transmissions of the PDU with that data content has been reached. If not, the count of the number of re-transmissions is incremented to trigger another re-transmission of the same MAC PDU and the procedure ends at 710. If at 704 the MAC PDU has been successfully received and decoded, or at 706 the maximum permitted number of transmissions of the PDU with that data content has been reached, the procedure marks the Hybrid ARQ process as complete at 712. At 714 a decision is then taken whether the currently received MAC PDU is associated with the reception index for the next expected MAC PDU reception and if not the Hybrid ARQ processing for the reception event of that MAC PDU ends at 716. If the currently received MAC PDU is associated with the reception index for the next expected MAC PDU reception, the received MAC PDU is delivered with maximum in-sequence order through the RLC layer to the upper layers based on the associated values of the reception indexes. The reception index is then updated to the value corresponding to the next expected reception at 720 and the procedure ends at 722.

The LTE specifications describe a timer called "re-order timer" to be started whenever a gap in the received sequence numbers is detected. This timer is to 'guess' when the sequence numbers in the gap can be declared as missed and re-ordering can be performed past these sequence numbers. It will be appreciated that the procedure for re-ordering described with reference to FIGS. 5 to 7 avoids the need for such a timer as the sequence numbers of missed MAC PDUs are already available at the re-order entity itself at the receiver end.

In some systems, security threats can arise based upon knowledge learned by injecting handcrafted parameter values (in the case of LTE, RLC PDU sequence numbers) from external entities (in the case of LTE, UEs), which can be used to exploit deficiencies of the system (in the case of LTE, eNodeB), for example by injecting deliberate out of order sequence numbers to create bursts of load on the system which may result in reduced performance, system failures for specific patterns of values and so on. The procedure for re-ordering described with reference to FIGS. 5 to 7 reduces reliance on externally provided parameter values for proper operation compared to the re-ordering method described in the LTE specifications which rely on the RLC sequence, thus increasing the system robustness in this respect.

The LTE specifications define a mode of operation called "Acknowledged Mode" wherein RLC PDUs detected as missing at the RLC sub layer 206 (after the Hybrid ARQ process) are re-transmitted by explicit signaling between the RLC sub layers 206 of the station 106 and the UE 108. The missing RLC PDUs are re-transmitted in MAC PDUs which are then treated as if they were new data blocks by the Hybrid ARQ process. When such RLC PDU re-transmissions are required, the scheduler 204, 206 may be unable to assign a sufficient number of bytes for its re-transmission as a complete data block due to resource constraints. In such a case the transmitting end is required to segment the re-transmitted RLC PDUs into several parts. The segments may also be subject to out of order reception and random block erasures due to parallel Hybrid ARQ.

An information list 800 established and transmitted by the eNodeB 106 in a status message contains the sequence numbers of the missed RLC PDUs and if applicable start and end offsets, and includes the instructions for segmentation and insertion of the segments in transport blocks. The number of segments for a re-transmitted RLC PDU block is not known beforehand. Identification of missed segments and rearranging then in proper order after reception based on the RLC PDU sequence numbers is a complicated process involving $n^2$ as factor in complexity measure where n is the number of segments.

Figure 8:
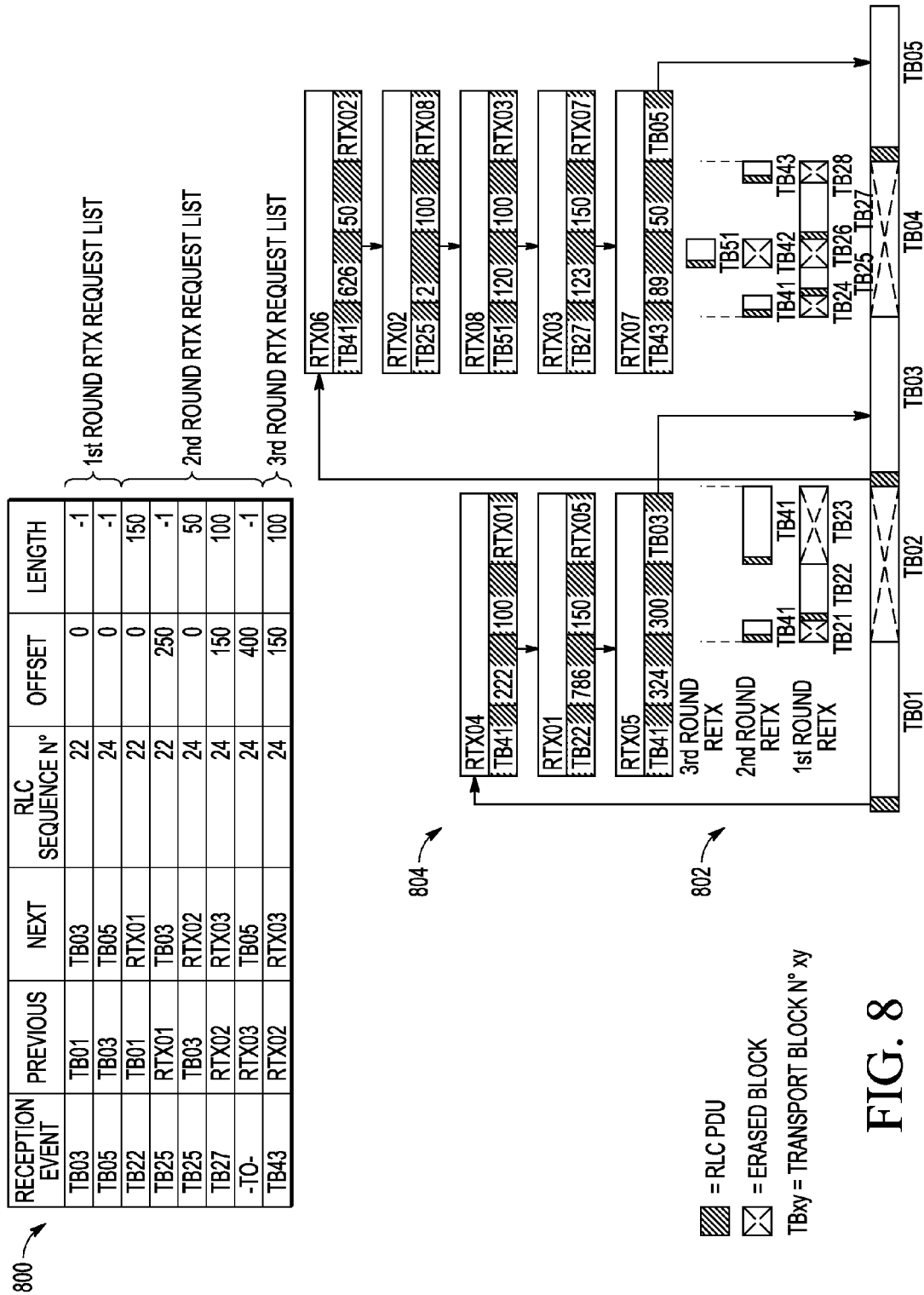
FIG. 8 is a schematic diagram of signals appearing in a method of detecting and re-ordering segments of re-transmitted data blocks in accordance with an example of an embodiment of the invention in conjunction with the method illustrated in FIGS. 5 to 7.

FIG. 8 is a schematic diagram of signals appearing in a method of detecting and re-ordering re-transmitted segments of data blocks as part of the method 500 of performing the re-ordering process described with reference to FIGS. 5 to 7 in accordance with an embodiment of the present invention, given by way of example. The explicit signaling for re-transmission comprises an information list 800 which is established and sent by the eNodeB 106 to the UE 108 with re-transmission requests, if necessary in more than one round if the re-transmitted segments are again missed. In FIG. 8, the information list 800 only shows the re-transmission information for the re-transmissions which are still not successful. The eNodeB 106 keeps an association of the sequence numbers of the missed RLC PDUs and the corresponding originally scheduled reception index. The method of FIG. 8 is based on the reception index of the MAC PDUs and re-ordering of the out of order reception is effectively eliminated from the RLC sub layer procedure 206. The method of FIG. 8 offers a more effective and simpler process than the standard process of the LTE specification. In particular, the method of FIG. 8 involves no higher than n as factor in complexity measure to perform missing segment detection and re-ordering of segments.

FIG. 8 shows the process illustrated by an example of reception of MAC PDUs (transport blocks) in MAC reception buffers 406 numbered TB01 to TB05 at 802, followed by reception of three rounds of re-transmissions at 804. The example of operation shown in FIG. 8 is the case of reception of an RLC PDU for a given logic channel (alone, with RLC PDUs for other logic channels present) in MAC PDU TB01, the PDU sequence number of the RLC channel of interest being 21. Next an RLC PDU is received in MAC PDU TB03 with RLC sequence number 23, from which it is apparent that the RLC PDU sequence number 22 is missing.

The column 'PREVIOUS' in the information list 800 indicates for each 'RECEPTION EVENT' where to link the head of the block when it is eventually received correctly. The column 'NEXT' indicates where to link the tail of the block. The column 'RLC SEQUENCE N°' identifies the missing RLC PDU. The column 'OFFSET' is the offset of the missing segment; in the case of RLC PDU sequence number 22 the whole PDU is missing and the offset is zero. The column 'LENGTH' is the length of the missing PDU segment, which is unknown in the case of RLC PDU sequence number 22, so it is set to '−1'. For example, the first row entry in the table 800 that the eNodeB 106 sends to the UE 108 gives all the data needed for re-transmitting the missing RLC PDU sequence number 22.

Next, as shown at 802, an RLC PDU is received in MAC PDU TB05 with RLC sequence number 25, from which it is apparent that the RLC PDUs sequence number 24 is missing. The relevant data appears in the second row of the information list 800 when the eNodeB 106 sends a re-transmission request to the UE 108 to re-transmit the missing RLC segments. The UE 108 begins re-transmissions, and a MAC PDU TB22 is received in the time slot defined by the reception index and corresponding to the same MAC buffer as was reserved for the missing MAC PDU TB02, as shown at 804. The MAC PDU TB22 identifies that it contains a segment of the missing RLC PDU sequence number 22 which starts at offset 150. From this it is apparent that the first 150 bytes of the RLC PDU sequence number 22 were missing. A row is added to the information list 800 with the relevant re-transmission data, and an RLS PDU segment dynamic block RTX01 is created registering the information that a segment is present in TB22 which will be linked when other segments are also received.

The information that the dynamic blocks such as RTX01 contain are shown at 806 and are successively:
the number of the MAC PDU containing the received RLC PDU segment (in this case TB22),
the offset of the received segment (bearing in mind that each MAC PDU contains one or more RLC PDUs each corresponding to a RLC logical channel), the offset being a function of the packing of the RLC PDUs into the MAC PDU,
the length of the segment whose re-transmission is requested, and
the next MAC PDU to which the requested segment should link, or the next RTX block number which holds another segment information.

The next RECEPTION EVENT is reception of a MAC PDU TB25 in the time slot defined by the reception index and corresponding to the same MAC buffer as was reserved for the missing MAC PDU TB04, as shown at 804. The MAC PDU TB25 identifies that it contains a segment of the missing RLC PDU sequence number 24 which starts at offset 50. From this it is apparent that the last part of the RLC PDU sequence number 22, expected in TB23 and specified in RTX01, is missing and its length is unknown. A row is added to the information list 800 with the relevant re-transmission data, indicating that the RLC PDU re-transmission specified in RTX01 will link to TB03. It is also apparent that the first 50 bytes of the RLC PDU sequence number 24 were missing. A row is added to the information list 800 with the relevant re-transmission data, and a dynamic block RTX02 is created registering the information that a segment is present in TB25 which will be linked to TB03 when received.

Similar operations of re-transmissions and requests for re-transmissions are performed in this example during the second and third rounds.

FIG. 8 shows the correct relative positions in the MAC reception buffers 406 of the original transmissions at 802 and of the re-transmissions of the MAC PDUs at 802, as defined by the reception indexes. The RLS PDU segment dynamic blocks such as RTX01 to RTX08 contain the re-ordering data for each re-transmitted segment are illustrated at 804, enabling the segment order after re-ordering, presence of all segments and elimination of any duplicates to be checked.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A telecommunication station for telecommunication with a user equipment using parallel hybrid automatic repeat request processes, the telecommunication station comprising:
   a scheduler for signaling to said user equipment allocations of resources and parameters for transmission and re-transmission of data blocks; and
   a set of reception buffers for receiving and re-ordering said data blocks from said user equipment, wherein said scheduler assigns a reception index to each data block of said data blocks to be transmitted by said user equipment, and
   wherein said scheduler assigns reception buffers from said set of reception buffers to received data blocks as a function of the assigned reception indexes identifying time slots scheduled for reception, wherein said scheduler detects and schedules re-transmission of missing Radio Link Control Packet Data Units within said data blocks after said hybrid automatic repeat request processes, said scheduler also scheduling said re-transmission of missing Radio Link Control Packet Data Units as segments in respective re-transmitted data blocks, said segments being assigned on reception to a buffer corresponding to a same reception index as the scheduled reception of the data block scheduled to contain that missing Radio Link Control Packet Data Unit, so that a data block newly transmitted by said user equipment and received in its scheduled time slot is assigned to a reception buffer corresponding to a new reception index, and a data block re-transmitted by said user equipment and received in a time slot later than its originally scheduled time slot is assigned to a reception buffer corresponding to the same reception index as its originally scheduled reception.

2. The telecommunication station of claim 1, wherein said data blocks to which said scheduler assigns a reception index and a reception buffer of said set of reception buffers are Media Access Control Packet Data Units.

3. The telecommunication station of claim 1, wherein said scheduler establishes and transmits to said user equipment in a status message an information list containing sequence numbers of the missing Radio Link Control Packet Data Units and if applicable start and end offsets, and includes instructions for segmentation and insertion of the segments in said data blocks.

4. The telecommunication station of claim 1, wherein said scheduler detects and establishes Radio Link Control Packet Data Unit dynamic blocks for a missing segment containing an identification of a received data block with a re-transmitted segment, an offset of a received segment, parameters of the missing segment to be re-transmitted and an identification of a next segment or data block to which the missing segment should link.

5. The telecommunication station of claim 1, wherein said telecommunication station complies with the Long Term Evolution ('LTE') standard or the Long Term Evolution-Advanced ('LTE-Advanced') standard.

6. A telecommunication system including a user equipment and a station for telecommunication with said user equipment using parallel hybrid automatic repeat request processes, said station comprising:
   a scheduler for signaling to said user equipment allocations of resources and parameters for transmission and re-transmission of data blocks; and
   a set of reception buffers for receiving and re-ordering said data blocks from said user equipment,
   wherein said scheduler assigns a reception index to each data block of said data blocks to be transmitted by said user equipment, and
   wherein said scheduler assigns reception buffers from said set of reception buffers to received data blocks as a function of the assigned reception indexes identifying time slots scheduled for reception, wherein said scheduler detects and schedules re-transmission of missing Radio Link Control Packet Data Units within said data blocks after said hybrid automatic repeat request processes, and wherein said scheduler schedules said re-transmission of missing Radio Link Control Packet Data Units as segments in respective re-transmitted data blocks, said segments being assigned on reception to a buffer corresponding to a same reception index as the scheduled reception of the data block scheduled to contain that missing Radio Link Control Packet Data Unit, so that a data block newly transmitted by said user equipment and received in its scheduled time slot is assigned to the reception buffer corresponding to a new reception index, and a data block re-transmitted by said user equipment and received in a time slot later than its originally scheduled time slot is assigned to a buffer corresponding to the same reception index as its originally scheduled reception.

7. The telecommunication system of claim 6, wherein said data blocks to which said scheduler assigns a reception index and a reception buffer of said set of reception buffers are Media Access Control Packet Data Units.

8. The telecommunication system of claim 6, wherein said scheduler establishes and transmits to said user equipment in a status message an information list containing sequence numbers of the missing Radio Link Control Packet Data Units and if applicable start and end offsets, and includes instructions for segmentation and insertion of the segments in said data blocks.

9. The telecommunication system of claim 6, wherein said scheduler detects and establishes Radio Link Control Packet Data Unit dynamic blocks for a missing segment containing an identification of a received data block with a re-transmitted segment, an offset of a received segment, parameters of the missing segment to be re-transmitted and an identification of a next segment or data block to which the missing segment should link.

10. The telecommunication system of claim 6, wherein said telecommunication system complies with the Long Term Evolution ('LTE') standard or the Long Term Evolution-Advanced ('LTE-Advanced') standard.

11. A method of telecommunication between a user equipment and a station using parallel hybrid automatic repeat request processes, said station comprising a scheduler signaling to said user equipment allocations of resources and parameters for transmission and re-transmission of data blocks and a set of reception buffers for receiving and re-ordering said data blocks from said user equipment, the method comprising:

said scheduler assigning a reception index to each data block of said data blocks to be transmitted by said user equipment; and said scheduler assigning reception buffers from said set of reception buffers to received data blocks as a function of the assigned reception indexes identifying time slots scheduled for reception, wherein said scheduler detects and schedules re-transmission of missing Radio Link Control Packet Data Units within said data blocks after said hybrid automatic repeat request processes, said scheduler being capable of scheduling said re-transmission of missing Radio Link Control Packet Data Units as segments in respective re-transmitted data blocks, said segments being assigned on reception to a buffer corresponding to a same reception index as the scheduled reception of the data block scheduled to contain that missing Radio Link Control Packet Data Unit, so that a data block newly transmitted by said user equipment and received in its scheduled time slot is assigned to the reception buffer corresponding to a new reception index, whereas a data block re-transmitted by said user equipment and received in a time slot later than its originally scheduled time slot is assigned to the reception buffer corresponding to the same reception index as its originally scheduled reception.

12. The telecommunication method of claim 11, wherein said data blocks to which said scheduler assigns a reception index and a reception buffer of said set of reception buffers are Media Access Control Packet Data Units.

13. The telecommunication method of claim 11, wherein said scheduler establishes and transmits to said user equipment in a status message an information list containing sequence numbers of the missing Radio Link Control Packet Data Units and if applicable start and end offsets, and includes instructions for segmentation and insertion of the segments in said data blocks.

14. The telecommunication method of claim 11, wherein said scheduler detects and establishes Radio Link Control Packet Data Unit dynamic blocks for a missing segment containing an identification of a received data block with a re-transmitted segment, an offset of a received segment, parameters of the missing segment to be re-transmitted and an identification of a next segment or data block to which the missing segment should link.

15. The telecommunication method of claim 11, wherein said station operates in accordance with the Long Term Evolution ('LTE') standard or the Long Term Evolution-Advanced ('LTE-Advanced') standard.

* * * * *